United States Patent [19]
Mirza et al.

[11] Patent Number: 5,883,420
[45] Date of Patent: *Mar. 16, 1999

[54] SENSOR DEVICE HAVING A PATHWAY AND A SEALED CAVITY

[75] Inventors: Andrew Mirza, Scottsdale; Kenneth M. Seddon, Gilbert, both of Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 575,944

[22] Filed: Dec. 20, 1995

[51] Int. Cl.$^6$ .................................................. H01L 29/82
[52] U.S. Cl. ........................ 257/419; 257/415; 257/417; 257/418; 438/53
[58] Field of Search .................................. 257/415, 417, 257/418, 419; 438/53

[56] References Cited

U.S. PATENT DOCUMENTS

| 4,744,863 | 5/1988 | Guckel et al. | 156/653.1 |
|---|---|---|---|
| 4,849,071 | 7/1989 | Evans et al. | 156/644.1 |
| 4,853,669 | 8/1989 | Guckel et al. | 338/4 |
| 4,996,082 | 2/1991 | Guckel et al. | 427/99 |
| 5,177,579 | 1/1993 | Jerman | 73/724 |
| 5,207,866 | 5/1993 | Lue et al. | 205/656 |
| 5,242,863 | 9/1993 | Xiang-Zheng et al. | 437/228 |
| 5,283,459 | 2/1994 | Hirano et al. | 257/419 |
| 5,335,550 | 8/1994 | Satou | 73/727 |
| 5,589,703 | 12/1996 | Baskett | 257/419 |

FOREIGN PATENT DOCUMENTS

| 01013773 | 1/1989 | Japan | H01L 29/84 |
|---|---|---|---|
| 8606548 | 11/1986 | WIPO | H01L 21/306 |

*Primary Examiner*—Mahshid D. Saadat
*Assistant Examiner*—Allan R. Wilson
*Attorney, Agent, or Firm*—Kenneth M. Seddon; Daniel R. Collopy

[57] ABSTRACT

A sensor (10,30) is formed that does not require a bonding process in an oxygen rich or vacuum ambient. In a first embodiment, a port (14), a channel (15) and an opening (18) are used to provide an oxidizing ambient to a cavity (13). During an oxidation process, the cavity (13) is sealed and any remaining oxidizing ambient is consumed to form a sealed cavity that is under a vacuum pressure. In an alternate embodiment, a cavity (32) is formed in a first substrate (31). The cavity (32) is covered by a second substrate (36) and an opening (33,34) is formed in the second substrate (36) above the cavity (32). These openings (33,34) allow an oxidizing ambient to enter the cavity (32).

33 Claims, 2 Drawing Sheets

SENSOR DEVICE HAVING A PATHWAY AND A SEALED CAVITY

BACKGROUND OF THE INVENTION

This invention relates, in general, to semiconductor devices, and more particularly, to sensors and methods of fabrication.

Semiconductor devices such as piezoresistive pressure sensors can utilize a thin semiconductor layer, or sensor diaphragm, as a sensing or active element. A piezoresistor is formed in the sensor diaphragm, and the resistance of the piezoresistor varies with the deformation of the sensor diaphragm. One method for forming such a structure first forms cavities in a first substrate using an anisotropic etch with potassium hydroxide (KOH). The cavity is then covered with a second substrate which acts as a diaphragm. Preferably, the second substrate should be bonded to the first substrate under a vacuum condition so that the cavity is sealed and can act as a reference pressure.

Unfortunately, the current state of the art of manufacturing equipment cannot provide a system which is capable of bonding large quantities of wafers under vacuum conditions. Currently, only single wafer bonding equipment is available for production facilities. This equipment tends to have poor throughput, which consequently increases manufacturing cost of the sensors produced. Accordingly, it would be very advantageous to provide a method for forming sensor structures that could use existing semiconductor processing equipment, but at an improved throughput compared to traditional wafer bonding equipment.

DETAILED DESCRIPTION OF THE DRAWINGS

Figure 1:
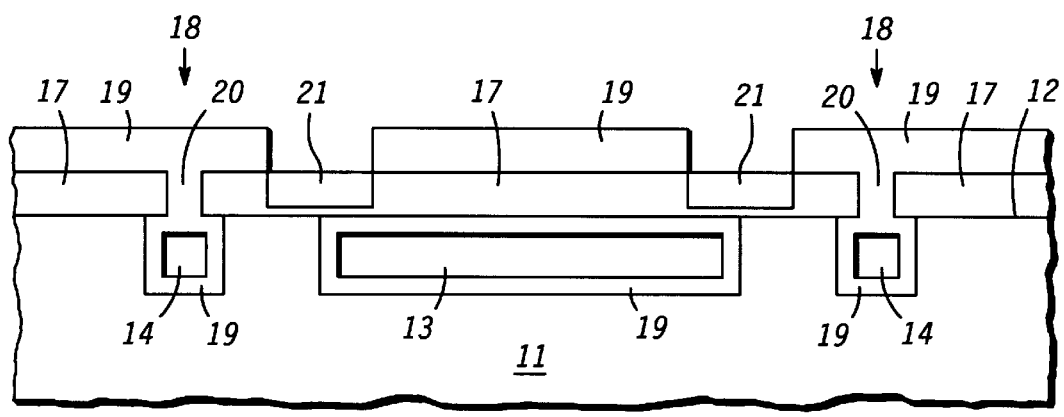
FIG. 1 is an enlarged cross-sectional view of a sensor according to a first embodiment of the present invention.

Turning to the figures for a more detailed description of the present invention, FIG. 1 is an enlarged cross-sectional view of a sensor 10, which is a semiconductor device that can be used as a sensor, a pressure sensor, an accelerometer, a gyro, or a valve. Sensor 10 comprises a cavity 13 formed in a first substrate 11. A second substrate 17 is bonded to a top surface 12 of first substrate 11. A portion of second substrate 17 provides a diaphragm above cavity 13 which deflects according to a pressure differential between the pressure in cavity 13 and the pressure of an ambient above second substrate 17. Piezoresistors 21 are formed in second substrate 17 to provide electronic signals proportional to the deflection of second substrate 17.

As will be described later, a significant advantage of sensor 10 is the formation of at least one port 14 and a channel 15 (see FIG. 2) in sequence with the formation of sensor 10. In conjunction with port 14, an opening 18 is formed in second substrate 17 thereby providing a pathway such that the ambient above second substrate 17 can pass into port 14, through channel 15, and into cavity 13. It is the formation of this pathway that allows the present invention to be performed using traditional semiconductor equipment with improved throughput.

As shown in FIG. 1, opening 18 has been sealed by an oxidizing process that seals cavity 13 using the oxidizing ambient above second substrate 17. The formation of opening 18 during the manufacturing process allows sensor 10 to be formed in a two step bonding process. In the first step, first substrate 11 and second substrate 17 are placed in contact with each other under any ambient using the most efficient manufacturing equipment available, vacuum conditions are not necessary. After forming opening 18, the second step, involves placing first substrate 11 and second substrate 17 into an oxidizing ambient to form a solid material 20 which seals opening 18 and converts cavity 13 to a sealed cavity. Solid material 20 is preferably formed by oxidizing the silicon portion of first substrate 11 to form a layer of silicon dioxide 19. Solid material 20 can also be provided by other compounds involving silicon such as by growing or depositing a silicon silicide for example.

Figure 2:
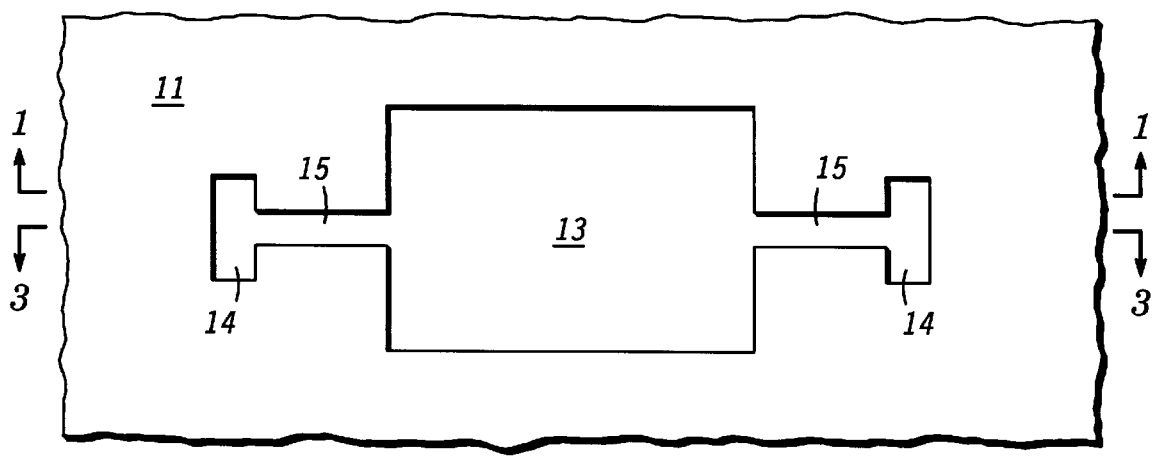
FIG. 2 is an enlarged top view of a sensor.

As shown in FIG. 2, channel 15 allows the oxidizing agent from the ambient above second substrate 17 to pass from port 14 to cavity 13. Therefore, instead of bonding first substrate 11 and second substrate 17 in an oxygen rich ambient, it is possible to bond the substrate 11 and 17 under the most cost effective methods and then fill cavity 13 with an oxidizing ambient using port 14 and channel 15.

Figure 3:
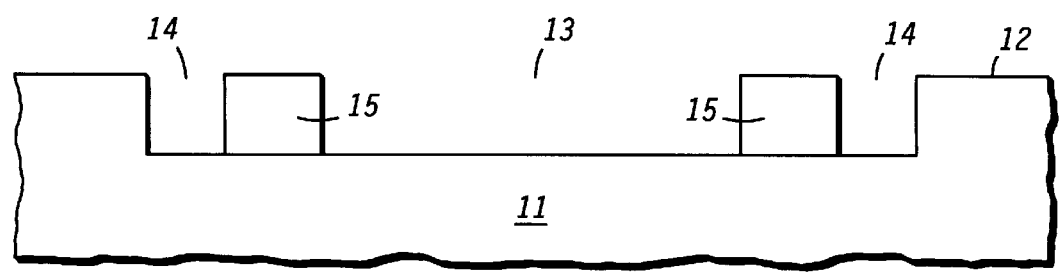
FIG. 3 is an enlarged cross-sectional view of the sensor in FIG. 2 in the early stages of fabrication.

Turning now to FIG. 3, a method for forming sensor 10, incorporating port 14, will be provided. FIG. 3 is an enlarged cross-sectional view of sensor 10 at an early stage in the fabrication process. First substrate 11 can be made from a variety of materials containing silicon and is preferably a single crystal silicon substrate. The top surface 12 of first substrate 11 is covered with a first masking layer (not shown), such as a layer of photoresist about 1 micron thick. The layer of photoresist is patterned to expose portions of first substrate 11 where cavity 13, channels 15, and ports 14 are formed. First substrate 11 is then etched using either an appropriate wet etch solution or a reactive ion etch (RIE) using either a chlorine or fluorine based ion. It should also be understood that the depth of cavity 13 and ports 14 can be varied by etching each structure as a separate process. After the first etch process, the masking layer is removed. If the first masking layer is photoresist, then a wet stripping solution comprising sulfuric acid can be used to remove the first masking layer.

Figure 4:
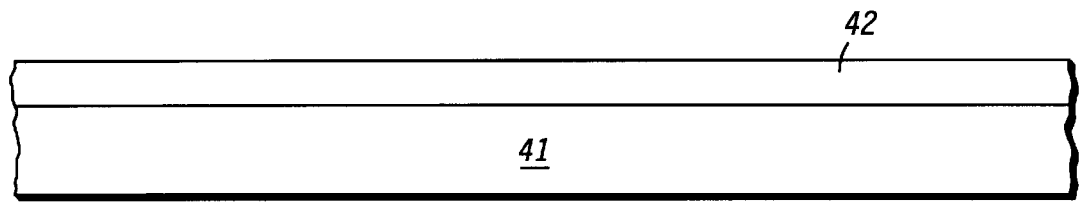
FIG. 4 is an enlarged cross-sectional view of a portion of a sensor according to a second embodiment of the present invention.
Figure 5:
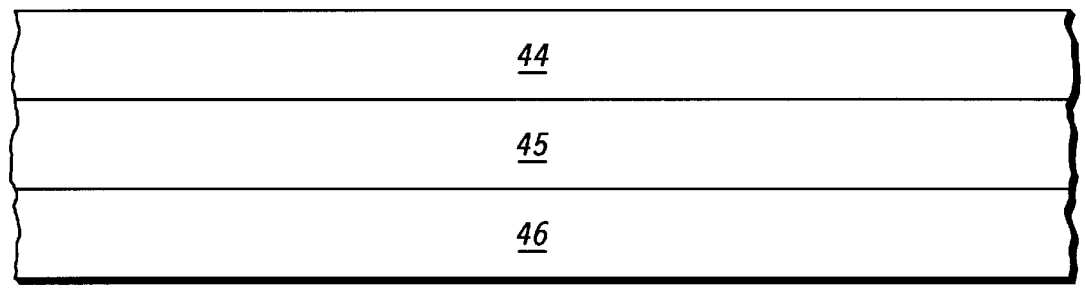
FIG. 5 is an enlarged cross-sectional view of a portion of a sensor according to a third embodiment of the present invention.

After forming cavity 13, second substrate 17 is bonded to first substrate 11 using a variety of processes common to those skilled in the art. Second substrate 17 preferably comprises silicon and various configurations or embodiments are shown in FIGS. 4 and 5. FIG. 4 is a second embodiment of the present invention where second substrate 17 is formed with two layers. In this second embodiment, second substrate 17 comprises an epitaxial silicon layer 42 on a layer of silicon 41. Epitaxial silicon layer 42 is the one that would contact top surface 12. It should also be understood that either or both of the two layers 41 and 42 can be doped to a n-type or p-type conductivity. FIG. 5 shows a third embodiment of the present invention where second substrate 17 is formed from a silicon-on-insulator (SOI) substrate comprising a silicon dioxide layer 45 sandwiched between two silicon layers 44 and 46. As mentioned above, the number and composition of layers that form second substrate 17 can be varied to adjust the performance of second substrate 17 as a diaphragm, and to assist in the thinning process to follow. Substrates 11 and 17 can also be formed using a silicon handle wafer or a layer of float zone silicon.

As part of the bonding operation, first substrate 11 and second substrate 17 are placed in contact with each other under any ambient condition. For instance, the bonding can take place at atmospheric pressure in a clean room ambient. The present invention does not require that the wafers be contacted under vacuum conditions. This is a major advantage in that the method to form sensor 10 obviates the need to bond first substrate 11 and second substrate 17 in an oxygen ambient or under vacuum pressure using slow and expensive processing equipment. Once the substrates 11 and 17 are in contact with each other, they may be annealed at a temperature of 700° C. to 1200° C. for a period of 1 to 6 hours to assist in the bonding process.

After the bonding process is completed, second substrate 17 may be thinned to adjust the performance of second substrate 17 as a diaphragm. Typically second substrate 17 is thinned to a thickness less than 500 microns by a chemical, electrochemical, or mechanical process. For instance, a grind and polish process can be used on the top surface of second substrate 17 to thin it to a desired thickness. Alternatively, if second substrate 17 were a SOI substrate, as provided by the third embodiment of the present invention and shown in FIG. 5, second substrate 17 could be etched using the silicon dioxide layer 45 of the SOI substrate as an etch stop. Furthermore, a chemical-mechanical polish (CMP) process can also be used to thin second substrate 17 to the desired thickness. Second substrate 17 is generally thinned to a thickness less than 40 microns thick and preferably has a thickness of approximately 10 microns.

Referring generally to FIG. 1, openings 18 above ports 14 can be formed using an RIE process. A second masking layer (not shown), preferably photoresist, is patterned over second substrate 17 to expose portions of second substrate 17 where openings 18 are formed. Using an RIE etch, openings 18 are made in second substrate 17 that are about 0.1 microns to 5 microns wide, but generally are less than 100 microns wide. Openings 18 should be narrow enough such that they are filled with solid material 20 during an oxidation step to follow. It should also be understood that it is possible to form openings 18 in second substrate 17 prior to thinning second substrate 17 to its desired thickness.

First substrate 11 and second substrate 17 are then placed into an oxidizing ambient to form oxide layer 19 that provides solid material 20. A high temperature furnace oxidation process that has either a wet or dry oxygen rich ambient at 700° C. to 1100° C. can be used to oxidize portions of first substrate 11 and second substrate 17. Any layer or structure made essentially of silicon and that is exposed to the oxygen rich ambient will oxidize and form a material consisting essentially of silicon dioxide. Since opening 18 provides a path for the oxygen rich ambient to enter cavity 13, any exposed portions of silicon along this path will oxidize as well. Depending on the relative size of opening 18, port 14, and channel 15, it possible for any or all of these three structures to fill with silicon dioxide and seal cavity 13 from the ambient above second substrate 17.

Note that since cavity 13 was exposed and vented to an oxygen rich ambient, it will still contain an oxygen rich ambient at the moment that cavity 13 is sealed. Therefore, if first substrate 11 and second substrate 17 remain at a high temperature, the oxygen in the sealed cavity will be consumed by the surrounding silicon in this anneal step and thus create a vacuum when first substrate 11 is allowed to cool. As a result, a vacuum of 0.001 mtorr to 760 torr can be formed inside the sealed cavity. This allows sensor 10 to be used as a reference pressure source since cavity 13 will be under a predictable vacuum pressure.

After cavity 13 is sealed, piezoresistors 21 are formed in second substrate 17. Piezoresistors provide an electronic response to the strain applied to second substrate 17 as the result of a differential pressure. To form piezoresistors 21, a third masking layer (not shown) is formed and patterned on second substrate 17 to expose portions of second substrate 17 near the edges of cavity 13. An ion implantation and an anneal process can be used to form piezoresistors 21 with the desired response characteristics. In addition to forming piezoresistors 21 on the topside of second substrate 17, it is also possible to fabricate semiconductor devices (not shown) on the top side of second substrate 17, which are electrically coupled to second substrate 17. These semiconductor devices can provide the logic necessary to measure the change in resistivity of piezoresistors 21 and to compute the pressure differential across second substrate 17. A passivation layer (not shown) can also be disposed overlying second substrate 17 to provide mechanical and chemical protection for the underlying interconnect and semiconductor devices.

Again, a major advantage of the present invention, is that it provides a method for forming a cavity 13 so that it is filled with an oxygen rich ambient. In order to do this, the present invention does not require that substrate 11 and 17 be bonded in either a vacuum or in an oxygen rich ambient. Instead, any wafer bonder and high temperature oxidation furnace can be used. Since these systems are batch process systems, the present invention provides a method for forming a sensor 10 with an improved throughput and, therefore, at a reduced cost.

Figure 6:
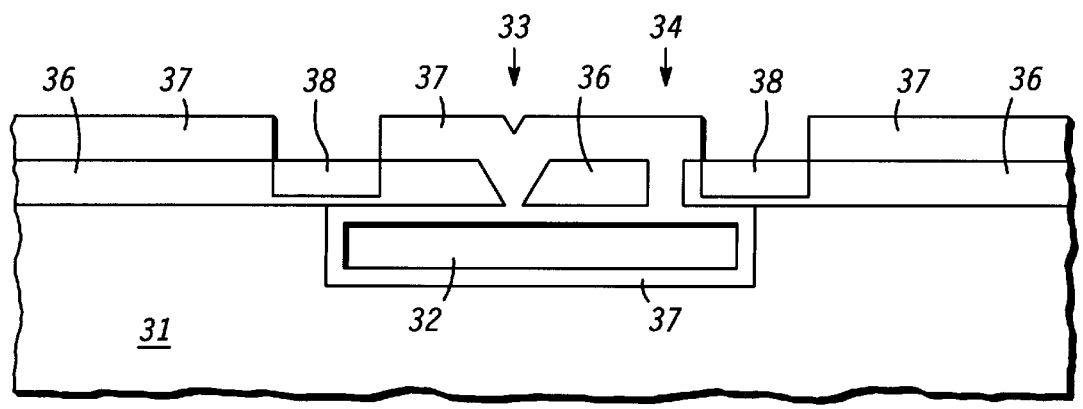
FIG. 6 is an enlarged cross-sectional view of a sensor according to a fourth embodiment of the present invention.

Turning now to FIG. 6, a fourth embodiment of the present invention will be provided. FIG. 6 is an enlarged cross-sectional view of a sensor 30 that comprises a cavity 32 formed in a first substrate 11 that is covered by a second substrate 36. Second substrate 36 acts as a diaphragm that senses a pressure differential between the pressure inside cavity 32 and an ambient above second substrate 36. Instead of forming an opening, a port, and a channel structure to provide a cavity with an oxygen ambient as described above, this fourth embodiment forms a vent 33 or 34 or an opening 33 or 34 in second substrate 36 above cavity 32. As shown in FIG. 6, these openings can have a variety of shapes such as a V-groove opening 33 or a regular opening from an RIE etch process as shown by opening 34.

The purpose of these opening 33 or 34 is to allow an ambient above second substrate 36 to enter cavity 32. This allows sensor 30 of the fourth embodiment to be formed in a similar process as described above for sensor 10 of the first embodiment. Cavity 32 is formed in first substrate 31 using an RIE or wet etch process, and then second substrate 36 is bonded to first substrate using the same methods described earlier. After bonding, openings 33 or 34 are formed in second substrate 36, more details to follow, and then sensor 30 is placed into an oxidizing ambient. A silicon dioxide layer 37 is formed which provides a solid material that fills openings 33 or 34 and seals cavity 32. Silicon dioxide layer 37 can be grown not only in openings 33 or 34, but on the top and bottom side of second substrate 36 and on the interior sides of cavity 32.

Once cavity 32 is sealed, sensor 30 remains at a high temperature so the oxidizing ambient trapped in cavity 32 is consumed and a vacuum is formed. Once sensor 30 is cooled, a vacuum pressure of 0.001 mtorr to 760 torr will be present inside cavity 32. Sensor 30 of the fourth embodiment is also like sensor 10 of the first embodiment in that the composition of first substrate 31 and second substrate 36 can be one of the materials suggested above. It should also be understood that openings 33 or 34 could be used in conjunction with the channel, port, and opening structures of the first embodiment.

Openings 33 or 34 can be formed in a variety of techniques, such as an RIE or wet etch process. A fourth masking layer (not shown) is patterned on second substrate 36 to expose the portions of second substrate 36 where openings 33 or 34 will be formed. A wet etch solution comprising an anisotropic etchant such as potassium hydroxide (KOH), sodium hydroxide (NaOH), lithium hydroxide (LiOH), cesium hydroxide (CsOH), ethylenediamine pyrocatechol (EDP), or tetra-methyl-ammonium-hydroxide (TMAH) can be used to form opening 33 with a V-groove shape. A method for using TMAH to preferentially etch silicon is described in U.S. Pat. No. 5,207,866, issued to Lue et al. on May 4, 1993, and is hereby incorporated by reference. It is also possible to form openings 34 using a dry etch process such as an RIE etch using either a chlorine or fluorine based ion. It should also be understood that the number and size of openings 33 or 34 can be varied depending on the amount of ambient inside of cavity 32 that must be vented and the impact openings 33 or 34 have on the pressure sensing characteristics of second substrate 36.

After sealing cavity 32, second substrate 36 is thinned to a desired thickness and piezoresistors 38 are formed in second substrate 36. Piezoresistors 38 can be n-type or p-type and can be formed using an ion implantation process to dope portions of second substrate 36 and then using an anneal process to activate the implanted ions. Preferably, piezoresistors 38 are formed near the portion of second substrate 36 at the edges of cavity 32 which is where the greatest stress will occur in second substrate 36. The exact location and number of piezoresistors 38 can be varied to adjust the electrical response of sensor 30. It should also be understood that the order of bonding substrates 31 and 36, forming opening 33 or 34, and forming piezoresistors 38 can be varied.

The fourth embodiment of the present invention provides a method for forming a sensor 30 that does not require that first substrate 31 and second substrate 36 be bonded in a vacuum or oxygen rich ambient. Sensor 30 can be formed using high volume production equipment which will reduce its manufacturing cost. Sensor 30 also has the advantage in that it will require less surface area on a wafer to form than sensor 10 of the first embodiment because there is no need to form ports or channels.

The embodiments of the present invention also provide an improvement over previously known methods for forming sensors in that they do not require the deposition of a sacrificial oxide layer and a polysilicon layer to form a cavity and sensing diaphragm. These added process steps not only increase the manufacturing costs, but form structures that have topography above the surface of the wafer. The present invention, however, not only provides for the elimination of these process steps, but forms a sensor structure that has a relatively planar surface. This makes it easier to form semiconductor devices above the sensors of the present invention than above previously known sensors that have sharp and significant topography.

By now it should be appreciated that the present invention provides a sensor, and a method of making, that simplifies the manufacturing requirements to form the sensor. The present invention obviates the need to bond wafers in an oxygen rich or vacuum ambient so traditional manufacturing equipment can be used. The present invention also provides a method that has fewer process steps than methods that use sacrificial layers to define the pressure cavities. Both of these features results in a process that is easier and cheaper to manufacture.

We claim:

1. A sensor comprising:

a first substrate having a top surface;

a cavity in the first substrate;

a port and channel extending into the first substrate from the top surface of the substrate, wherein the channel couples the cavity to the port;

a second substrate on the top surface of the first substrate overlying at least the cavity in the first substrate, wherein the second substrate overlying the cavity provides a diaphragm, and the diaphragm moves in response to a pressure differential between the cavity and an ambient above the second substrate;

a first opening passing completely through the second substrate, wherein the first opening is separated from the diaphragm, is overlying at least a portion of the port, and provides a pathway to the cavity; and a first solid material filling a portion of the pathway such that the cavity is sealed.

2. The sensor of claim 1 wherein the cavity is at a pressure of 0.001 mtorr to 760 torr.

3. The sensor of claim 1 wherein the first solid material comprises a material selected from the group consisting of silicon, silicon dioxide, and oxide.

4. The sensor of claim 1 further comprising a second opening in the second substrate above the port, the second opening filled with a second solid material.

5. The sensor of claim 1 wherein the first substrate comprises a material selected from the group consisting of a silicon, epitaxial silicon, float zone silicon, and a handle wafer.

6. The sensor of claim 1 wherein the first substrate comprises a layer of silicon on a layer of silicon dioxide, the layer of silicon providing the top surface.

7. The sensor of claim 1 wherein the sensor is a sensor selected from the group consisting of a pressure sensor, an accelerometer, a gyro, and a valve.

8. The sensor of claim 1 wherein the second substrate comprises a material selected from the group consisting of silicon, silicon dioxide, epitaxial silicon, and float zone silicon.

9. The sensor of claim 1 wherein the first opening comprises a V-groove.

10. The sensor of claim 1 further comprising a piezoresistor formed in the second substrate overlying the cavity.

11. A sensor comprising:

a first substrate having a top surface;

a cavity formed in the first substrate;

a port formed in the first substrate, at least a portion of the port being contiguous with the top surface;

a channel formed in the first substrate connecting the port to the cavity; and a second substrate contiguous with the top surface of the first substrate such that at least the cavity, the port, and the channel are covered by the second substrate, the second substrate having an opening above the port and a first solid material in the opening that seals the cavity.

12. The sensor of claim 11 wherein the cavity is under a pressure of 0.001 mtorr to 760 torr.

13. The sensor of claim 11 wherein the first substrate comprises a material selected from the group consisting of silicon, epitaxial silicon, float zone silicon, and a handle wafer.

14. The sensor of claim 11 wherein the first substrate comprises a layer of silicon on a layer of silicon dioxide, the layer of silicon providing the top surface.

15. The sensor of claim 11 wherein the sensor is a sensor selected from the group consisting of a pressure sensor, an accelerometer, a gyro, and a valve.

16. The sensor of claim 11 further comprising at least one vent in the second substrate above the cavity.

17. The sensor of claim 16 further comprising a second solid material in the at least one vent.

18. The sensor of claim 16 wherein the at least one vent comprises a V-groove.

19. The sensor of claim 11 wherein the first solid material comprises silicon dioxide.

20. The sensor of claim 11 wherein the second substrate comprises a material selected from the group consisting of silicon, silicon dioxide, epitaxial silicon, and float zone silicon.

21. The sensor of claim 11 wherein the second substrate is flexible and moves according to a differential pressure between a pressure in the cavity and a pressure above the second substrate.

22. The sensor of claim 11 wherein the second substrate is less than 500 microns thick.

23. The sensor of claim 11 further comprising a piezoresistor formed in the second substrate overlying the cavity.

24. The sensor of claim 1 wherein the cavity in the first substrate has vertical sidewalls and a bottom, the vertical sidewalls being substantially orthogonal to the bottom where the vertical sidewalls intersect the bottom of the cavity.

25. The sensor of claim 1 wherein the second substrate is in direct contact with the first substrate, and the sensor is devoid of an interfacial layer between the first substrate and the second substrate.

26. The sensor of claim 1 wherein the first opening has a width ranging from about 0.1 microns to 5 microns.

27. The sensor of claim 1 wherein the cavity has an edge, and the channel in the substrate provides a portion of the pathway that extends laterally away from the edge of the cavity.

28. A semiconductor device comprising:
a first substrate having a top surface, wherein the first substrate has a cavity and a port extending from the top surface of the first substrate and into the first substrate, and the first substrate has a channel extending from the cavity to the port so that the port is in communication with the cavity;
a second substrate bonded to the first substrate and having an opening passing completely through the second substrate in a direction that is substantially orthogonal to a plane defined by the second substrate, wherein a portion of the second substrate over the cavity provides a diaphragm that moves in response to a pressure differential between the cavity and an ambient above the second substrate, and the opening provides a portion of a pathway from the ambient above the second substrate to the cavity in the first substrate; and
a solid material in at least a portion of the pathway so that the cavity is isolated from the ambient.

29. The semiconductor device of claim 28 wherein the channel extends from the top surface of the first substrate and extends substantially laterally from the cavity to the port.

30. The semiconductor device of claim 28 wherein the opening in the second substrate is separated from the portion of the second substrate that provides the diaphragm, and the opening extends through the second substrate in a direction that is substantially orthogonal to the diaphragm.

31. The sensor of claim 28 wherein the diaphragm has an upper surface and a lower surface that are substantially parallel and define a plane, the opening in the second substrate being within the plane defined by the diaphragm.

32. The sensor of claim 28 further comprising a vent within the diaphragm, the vent being above the cavity.

33. An apparatus comprising:
a first substrate having an upper surface, wherein the first substrate has a cavity and a port extending from the upper surface into the first substrate, wherein the first substrate further has a channel extending from the cavity to the port; and
a second substrate having an upper surface and a lower surface that define a plane, and further having an opening that extends from the upper surface to the lower surface, wherein a portion of the second substrate over the cavity provides a diaphragm that is in the plane defined by the upper surface and the lower surface, and wherein the channel region extends in a direction that is substantially parallel to the plane defined by the upper surface and the lower surface.

* * * * *